Sept. 11, 1951          G. FOX          2,567,427

SKIP HOIST MOTOR CONTROL

Filed March 18, 1949          3 Sheets-Sheet 1

Fig. 1

Fig. 2, Part A

INVENTOR.
Gordon Fox

BY
ATTORNEYS

Fig. 2 Part B

INVENTOR.
Gordon Fox

Sept. 11, 1951     G. FOX     2,567,427

SKIP HOIST MOTOR CONTROL

Filed March 18, 1949     3 Sheets-Sheet 3

| CTS Position | | Operating Combinations And Switch Arrangements | | | | | | | | | | | |
|---|---|---|---|---|---|---|---|---|---|---|---|---|---|
| | | 1KSA | 2KSA | CB | KSD | KSE | 1KSC | 2KSC | KSF | KSG | KSH | KSI | KSJ | KSK |
| | | S.P.D.T. Switch | | | S.P.D.T. Switches | | | | D.P.D.T. Switches | | | | | |
| 1 | 1G+2G in // 2 motors in parallel | U° D↕ | U° D↕ | closed | U↕ D° | U↕ D° | U↕ D° | U↕ D° | ↕↕ oo | ↕↕ oo | ↕↕ oo | ↕↕ oo | ↕↕ oo | ↕↕ oo |
| 2 | 1G to 1M 2G to 2M | U° D↕ | U° D↕ | oo | U° D↕ | U° D↕ | U↕ D° | U↕ D° | ↕↕ oo | ↕↕ oo | ↕↕ oo | ↕↕ oo | ↕↕ oo | ↕↕ oo |
| 3 | 1G only 2 motors in series | U↕ D° | U° D↕ | oo | U° D↕ | U° D↕ | U° D↕ | U° D↕ | ↕↕ oo | ↕↕ oo | ↕↕ oo | ↕↕ oo | ↕↕ oo | oo ↕↕ |
| 4 | 2G only 2 motors in series | U↕ D° | U↕ D° | oo | U° D↕ | U° D↕ | U° D↕ | U° D↕ | ↕↕ oo | ↕↕ oo | ↕↕ oo | ↕↕ oo | oo ↕↕ | ↕↕ oo |
| 5 | 1G+2G in // 1M only | U° D↕ | U° D↕ | closed | U° D° | U° D° | U° D° | U° D° | ↕↕ oo | oo ↕↕ | ↕↕ oo | ↕↕ oo | ↕↕ oo | oo ↕↕ |
| 6 | 1G+2G in // 2M only | U° D° | U° D° | closed | U↕ D° | U↕ D° | U↕ D° | U↕ D° | oo ↕↕ | ↕↕ oo | ↕↕ oo | ↕↕ oo | ↕↕ oo | ↕↕ oo |

*Fig. 3*     ⌒ or ↕ indicates closed
          o o or o/o indicates open

| CTS | Switch | | Gen.1+2 Motor1+2 | Gen.1+Mot.1 Gen.2+Mot.2 | Gen.1 Motor1+2 | Gen.2 Motor1+2 | Gen.1+2 Motor 1 | Gen.1+2 Motor 2 |
|---|---|---|---|---|---|---|---|---|
| 1 | o—||—o—||—o a b c | a-b | — | — | — | — | — | X |
| | | b-c | — | — | — | — | X | — |
| 2 | o———||———o a c | a-c | X | X | X | X | X | — |
| 3 | o———||———o a c | a-c | X | X | X | X | — | X |
| 4 | o———||———o a c | a-c | X | X | X | X | X | — |
| 5 | o———||———o a c | a-c | X | X | X | X | — | X |
| 6 | o———||———o a c | a-c | — | — | — | — | X | X |

*Fig. 4*     — indicates open
          X indicates closed INVENTOR.
Gordon Fox
BY
*William Hughey Bryan + Hume*
ATTORNEYS Patented Sept. 11, 1951

2,567,427

UNITED STATES PATENT OFFICE 2,567,427

SKIP HOIST MOTOR CONTROL

Gordon Fox, Chicago, Ill., assignor, by mesne assignments, to Koppers Company, Inc., a corporation of Delaware Application March 18, 1949, Serial No. 82,239

13 Claims. (Cl. 318—140)

The present invention relates to improvements in skip hoist motor controls.

United States Letters Patent 2,379,958, issued July 10, 1945, United States Letters Patent 2,370,855, issued May 10, 1945, and application for United States Letters Patent Serial 618,015, filed September 22, 1945, all in the name of the present applicant, disclose skip hoist motor controls employing a pair of hoist motors for operating the winding drum of a skip hoist.

Said Patent 2,370,855 discloses and claims a dual drive skip hoist provided with an adjustable voltage control in which an adjustable voltage generator supplies direct current to the two hoist motors, which may be connected either in series with each other or in parallel with each other.

The arrangement disclosed in Figure 3 of the above Patent 2,370,855 contemplates a generator large enough to supply both motors. When one motor is required to operate alone, there is an abundance of generator capacity to supply said motor without installing an oversize generator as a part of the motor generator set. In the arrangement mentioned, if this single generator should fail, the hoist would be inoperative. In view of this fact, installations have been made in which two generators are employed, one supplying power for one hoist motor, and the other generator supplying power for the other hoist motor. If a single one of said generators is utilized in an emergency to supply a single motor to operate the hoist, certain complications arise. Firstly, the dual-drive hoist must be driven by a single motor, rather than by two motors, there being some disadvantages to such procedure. Secondly, the single operating generator must supply sufficient current to develop sufficient torque in the single operating motor to handle the hoist with whatever load may be involved. Ordinarily, the loading associated with single motor operation is considerably greater than the load per motor with dual drive because of the fact that the entire weight of the skip must be handled by a single motor when starting from rest. The motors installed normally have some reserve capacity for single motor operation. With a setup as just described, the generator must have corresponding capacity and must therefore be oversize, that is, it must be more than half as large as a single generator supplying two motors in parallel.

Expressed in other language, it has been suggested in the past to supply the two motors of a dual skip hoist from two generators. In some instances, each generator has been adapted to supply one motor separately. In other instances, the two motors and the two generators have been connected in "staggered series." This means that the armatures have been connected in a circuit comprising one generator followed by one motor followed by the other generator followed by the other motor, thence back to the point of origin. If the generators are connected to supply their individual motors only, the operation of a skip hoist is somewhat circumscribed in the event of trouble with either motor or either generator. If the motors and generators are connected in staggered series, the arrangement is effective in the case of the loss of one generator as the remaining generator can be utilized to supply the remaining two motors. The same current passes through both motors and causes them both to develop torque, retaining the dual drive feature of the hoist. Because of the loss of one generator, the voltage of the circuit is halved and consequently the speed of operation is correspondingly reduced. The staggered series arrangement is not very satisfactory in case of the loss of one motor. In such event it becomes necessary to "jumper out" the armatures of the other motor and its corresponding generator. The single undamaged motor is then supplied from a single generator. The capacity of the hoist is approximately halved.

The mill-type motors commonly employed for skip hoist service have considerable reserve capacity. By means of forced ventilation, it is possible to utilize this capacity in single motor operation to an extent greater than commonly applies in the case of dual drive. It is obvious that if the inherent overload capacity of the motor is to be utilized in an emergency for single motor operation, a corresponding generator capacity must be available. The generators ordinarily used, however, do not have as much overload capacity as the mill-type motors. Therefore, if a single generator is to be used in such an emergency, it must have marginal capacity, that is, is must be oversize.

An object of the present invention is to provide a skip hoist motor control involving a pair of driving motors and a pair of generators for supplying current to said motors which skip hoist motor control avoids the difficulties heretofore encountered in two motor, two generator systems as above discussed.

A further object is to provide a skip hoist motor control employing two driving motors and two generators for supplying current to said motors in which satisfactory emergency operations can be carried on in the event of breakdown of either of said motors or either of said generators.

A further object is to provide a skip hoist motor control employing two driving motors with two generators which may be operated under emergency conditions if one generator is inoperative by using the two motors in series whereby the motors receive half voltage and operate at half speed but provide a normal torque.

A further object is to provide an improved skip hoist motor control employing two driving motors and two generators which may be operated under emergency conditions if one motor is rendered inoperative by operating the two generators in parallel to supply the one motor, thereby insuring maximum torque of the motor.

A further object is to provide an improved skip hoist control employing two driving motors and two compound wound generators in which the compounding field windings may be crossed when the two generators are operated in parallel and may be connected in series with their respective armatures when each generator supplies its respective motor and when either generator supplies the two motors connected in series.

Further objects will appear as the description proceeds.

Referring to the drawings—

DESCRIPTION OF INSTRUMENTALITIES

Figure 1:
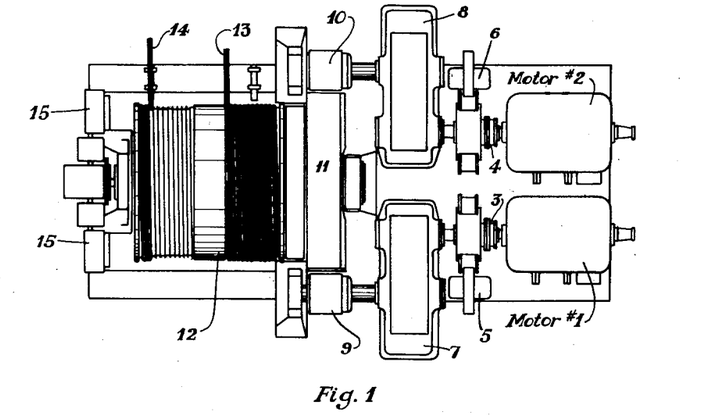
Figure 1 is a plan view illustrating the winding drum for operating the two cables of a double skip hoist, such winding drum having associated therewith limit switch means, driving motors, brakes and gearing for operating and controlling said winding drum.

As illustrated in Figure 1, a pair of driving motors 1 and 2 is provided. Said motors 1 and 2 are connected through couplings 3 and 4 respectively, through brakes 5 and 6 to gear reduction units 7 and 8. The low-speed sides of said gear reduction units 7 and 8 are connected respectively to pinions 9 and 10, which mesh with the gear 11. Said gear 11 is rigidly secured to the drum 12, which has secured thereto the cables 13 and 14. Said cables 13 and 14 may be connected respectively to the right skip and the left skip of a blast furnace charging mechanism. It will be understood that when one or both of the motors 1—2 are energized to cause rotation of the winding drum 12 in one direction, one of the cables 13 will be wound up on the drum 12, and the other of said cables will be paid off, and, conversely, when the energization of one or both of the motors 1—2 is such as to cause reverse rotation of the winding drum 12, the movement of said cables 13 and 14 will be reversed. Limit switch means connected to be driven in synchronism with the drum 12 are indicated diagrammatically by the numeral 15.

A description of the electrical diagram in Figure 2 may be prefaced by a statement of the significance of the numerals and letters used thereon as follows:

Letter G refers to the generators.
Letter M refers to the motors.
Letter R refers to contact terminals of resistors.
Letters BR refer to the operating coils and contacts responsive thereto on the brake contactors.
Letters EX refer to the exciter of the motor generator set.
Letters KS refer to various knife switches.
Letters LSU refer to the operating coil and contacts responsive thereto of a relay controlling the movement of the left skip up.
Letters RSU refer to the operating coil and contacts responsive thereto of a relay controlling the movement of the right skip up.
Letters Pos. refer to the positive line.
Letters Neg. refer to the negative line.
The letter T refers to time delay relays.
The letters UV refer to the operating coil and the contacts responsive thereto of the undervoltage relay.
The letters L and R refer to the operating coils and the contacts responsive thereto for controlling the direction of rotation of the drum for respectively raising the left skip or the right skip.
The letters FW refer to the operating coils and the contacts responsive thereto of motor field weakening relays.
The letters SD refer to the operating coils and the contacts responsive thereto of slow down relays.
The letters CTS refer to manual switches for selecting any one of six combinations of elements for altenative modes of operation.
The letters LS and RS refer to mechanical switches closed in response to movements of the winding drum. These are termed "limit switches." Though in the drawing the switches LS and RS are represented as being on one drum, actually in practice it is preferred to mount them on separate drums, the LS switches being associated with the left skip and the RS switches being associated with the right skip.

The elements of the switches LS and RS are represented by oblong boxes having their long axes vertical. The oblong boxes having their long dimensions horizontal represent the portions of the cycle of operation during which the corresponding switch elements are bridged.

Contacts biased to open position are indicated by vertical parallel lines and contacts biased to closed position are indicated by vertical parallel lines with a diagonal line therethrough.

In general, contactors and relays are identified by the characters applied to their operating coils and the contacts thereof are differentiated by the addition of suffixes. For example, 1GF represents the operating coil of a corresponding contactor and the characters 1GF1, 1GF2 and 1GF3 represent the contacts of said contactor. The numerals 11, 12 preceding other characters refer to instrumentalities associated with motor 1. The numerals 21, 22 preceding other characters refer to instrumentalities associated with motor 2.

Figure 2:
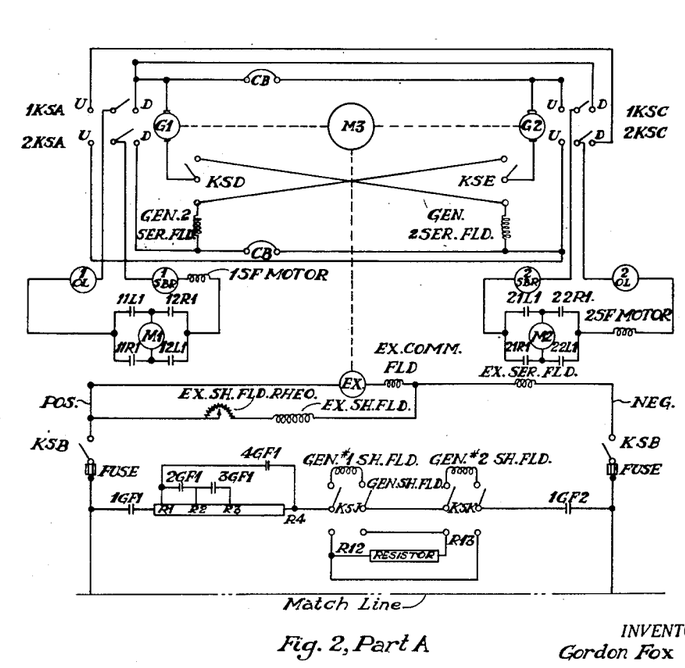
Figure 2 is an electrical diagram which, for convenience, is divided into two parts indicated as Figure 2, part A, and Figure 2, part B.

Referring to Figure 2, part A, a motor generator set is illustrated diagrammatically by the motor armature M3, the generator armatures G1 and G2 (connected to be driven by said armature M3) the exciter armature EX and the generator series field coils marked Gen. 1 Ser. Fld. and Gen. 2 Ser. Fld. Double throw knife switches 1KSA, 1KSC, 2KSA, 2KSC, KSD and KSE are provided to switch the motor armature circuits as required and as tabulated in Figure 3 (to be discussed hereinafter). A circuit breaker CB is provided having two poles, one of which is connected between the positive terminals of the two generator armatures G1 and G2, the other pole being connected (through certain switches) between the negative terminals of said two armatures G1 and G2.

The motors Nos. 1 and 2 contemplated in the present invention are mill type motors, preferably having approximately the same capacities. Mill type motors have acquired a distinct status in the art and are capable of carrying a substantial overload over rated capacity for material periods of time.

The generators G1 and G2, as contemplated in the present invention, preferably having approximately the same capacities, each having a capacity for regularly supplying the current at the voltage suitable for powering either of the motors M1 or M2, operating at rated capacity.

The armatures of motors 1 and 2 are indicated by the characters M1 and M2 and have in their respective circuits a plurality of directional contacts, conventionally illustrated series field windings (marked "motor 1SF" and "motor 2SF" for motors 1 and 2, respectively), series brake relays 1SBR and 2SBR and overload relays 10L and 20L. In circuit with the armature EX of the exciter between the positive line Pos. and the negative line Neg. are the exciter commutating field winding Ex. Comm. Fld. and the series field winding Ex. Ser. Fld. From the Pos. line, paralleling the exciter armature circuit, is a shunt field winding Ex. Sh. Fld. in series with a suitable adjustable rheostat Ex. Sh. Fld. Rheo. Said exciter armature EX delivers current through the commutating field winding Ex. Comm. Fld. and the series field winding Ex. Ser. Fld. to the positive line Pos. and the negative line Neg.

Located in the positive and negative lines are the two poles of the double-pole, single-throw knife switch KSB, both poles of which are provided with fuses. Connected across the positive and negative lines immediately beyond the fused knife switch KSB are the generator shunt field windings Gen. 1 Sh. Fld. and Gen. 2 Sh. Fld. for generator armatures G1 and G2, respectively. Double pole, double throw knife switches KSJ and KSK are provided so that either generator shunt field winding may be cut into or out of circuit, a resistor being provided which may be cut into the circuit in place of either generator shunt field winding by means of said knife switches KSJ and KSK. Connected in series with the generator shunt field windings are the contacts of relays 1GF1 and 1GF2 which serve to connect said shunt field windings across the positive and negative lines. Also located in series with the contacts 1GF1, the generator shunt field windings and the contact 1GF2 is the resistor having the taps R1, R2, R3 and R4. Contacts 2GF1, 3GF1 and 4GF1 serve to vary the effective resistance of said resistor.

Referring now to Figure 2, part B, a circuit is illustrated between the positive and negative lines which includes the motor shunt field winding 1 Sh. Fld. and 2 Sh. Fld., both being adapted to be connected in series with a suitable filed adjusting resistor having the taps R5, R6, R7, R8 and R9 which, in combination with the contacts 1FW1 and 2FW1 and the knife switches SAS1 and SAS2, control the effective resistance of said resistor. Controlling the motor shunt field winding 1 Sh. Fld. is the double-pole, double-throw knife switch KSF and controlling the motor shunt field 2 Sh. Fld. is the double-pole, double-throw knife switch KSG. By means of these knife switches resistor having the taps R14, R15 may be substituted for motor No. 1 shunt field winding 1 Sh. Fld., and resistor having the taps R16 and R17 may be substituted for the motor shunt field winding 2 Sh. Fld.

Next is the brake circuit connected across the positive and negative lines through the contacts 1BR1 and 2BR1 and a current limiting resistor having the taps R10 and R11. Said circuit includes the brake coil 1BRK for motor No. 1 and the brake coil 2BRK for motor No. 2, either of which may be switched into or out of service by means of the double-pole, double-throw knife switches KSH or KSI, respectively. By means of said double-pole, double-throw knife switches, a resistor having the taps R18 and R19 may be substituted for either of the brake coils 1BRK or 2BRK.

Disposed in the positive and negative lines below the brake circuit immediately above described is a double-pole control switch indicated as CS.

The circuits across the line between the positive line Pos. and the negative line Neg. are numbered 1, 2, et cetera. Circuit 1 extends from the positive line Pos. through the stop-reset push button (biased to open position) through the coil UV of an under-voltage relay, the normally closed contacts 10L1, 20L1, FL1 and SC1 to the negative line Neg. The stop-reset push button is provided with two movable contacts adapted to alternatively bridge the fixed contacts a—a or b—b. Said contacts b—b are arranged in parallel with the contacts a—a. Located in the positive line Pos. between the connections to contacts a—a and contacts b—b are the contacts UV1 responsive to the under-voltage relay coil UV. Said contacts UV1 are biased to open position.

Circuit 2 extends from the positive line Pos. through the single pole push button switch LSU—PB (biased to open position), through the relay coil LSU, thence to the limit switch contacts LS3 and to the negative line Neg.

Circuit 3 extends from the positive line Pos. through the push button switch RSU—PB (biased to open position) through the relay coil RSU, thence through the limit switch contacts RS3 to the negative line Neg.

Circuit 4 extends from the positive line Pos. through the contacts LSU1, 1SBR1 and 2SBBR1, thence through the operating coil 1BR to the negative line Neg. Said contacts LSU1, 1SBR1 and 2SBR1 are biased to open position. Across the open contacts 1SBR1 are contacts A and B and across the open contacts 2SBR1 are contacts B and C. Said contacts A, B and C are connections of a switch CTS1. Said contacts A, B and C are used to shunt out the normally open contacts 1SBR1 or 2SBR1 as required under certain operating conditions.

Circuit 5 extends from the positive line Pos. through the contacts RSU1 (biased to open position) and the contacts 1BR2 (biased to open position) through the relay coil 2BR to the negative line Neg. The normally open contacts 1BR2 are bridged across the two pairs of contacts 1SBR1 and 2SBR1.

Circuit 6 extends from the positive line Pos. through the contacts 1BR3 (biased to closed position) and through the timer relay coil 1T to the negative line Neg.

Circuit 7 extends from the positive line Pos. to the contacts 1T1 (biased to open position) through the relay coil 3BR to the negative line Neg.

Circuit 8 extends from the positive line Pos. through the contact LSU2 (biased to open position) through the contacts CTS2, contactor coils IIL and I2L, in parallel with each other, to the negative line Neg. Branching from the circuit 8 at a point beyond the contacts LSU2 is a branch circuit 8a which leads through the contacts CTS3 and coils 2IL and 22L, in parallel with each other, to the negative line Neg.

Circuit 9 is analogous to circuit 8 and extends from the positive line Pos. through the contacts RSU2 (biased to open position) through the contacts CTS4 and coils LR and I2R, in parallel with each other, to the negative line Neg. Branching from the circuit 9 at a point beyond the contacts RSU2 is the branch circuit 9a which leads through the contacts CTS5 and coils 2IR and 22R, in parallel with each other, to the negative line Neg.

Circuit 10 extends from the positive line Pos. through the contacts LSU3 (biased to open position) through the contacts IFW2 (biased to open position), in parallel with which are the contacts IGF3 (biased to open position), thence through the contacts IT2 (biased to closed position) and through the relay coil IGF to the negative line Neg.

Circuit II extends from the positive line Pos. through the contacts RSU3 (biased to open position), through the contacts 2SDI (biased to open position), through the contacts 2TI (biased to closed position), through the contacts IGF4 (biased to open position) and through the relay coil 2GF to the negative line Neg.

Circuit 12 is a branch of circuit II and extends from a point beyond the contacts RSU3 through the contacts ISD4 (biased to open position), the contacts 2GF3 (biased to open position), the contacts 3TI (biased to closed position) and the relay coil 3GF to the negative line Neg. Shunting the normally open contacts ISD4 is a circuit including the contacts 3GF2 (biased to open position) and the contacts 9TI (biased to open position).

Circuit 13 extends from the point of intersection of circuit 12 with circuit II through the contacts 8TI (biased to open position) through contacts 3GF3 (biased to open position) through contacts 4TI (biased to closed position) and through the relay coil 4GF to the negative line Neg.

Circuit 14 extends from the positive line Pos. through the contacts LSU4 (biased to open position), through the contacts 5TI (biased to open position) and through the relay coils IFW and 6T, in parallel with each other, to the negative line Neg. Disposed in parallel relationship with the contacts 5TI are the contacts 7TI (biased to open position).

Circuit 15 extends from the positive bus Pos. through the contacts RSU4 (biased to open position) through the contacts 6TI (biased to open position), and the relay coil 2FW to the negative line Neg. Shunting the contacts 6TI are the contacts ISDI (biased to closed position). Also shunting the contacts 6TI are the contacts 6TS6 (biased to open position). Contacts LSU4 and RSU4 are connected in parallel with each other.

Circuit 16 extends from the positive line Pos. through the relay coil ISD through the contacts LSU5 (biased to open position) and the limit switch contacts LSI to the negative line Neg. In parallel with the contacts LSU5 and the limit switch contacts LSI is a circuit including the contacts RSU5 (biased to open position) and the limit switch contacts RSI.

Circuit 17 extends from the positive line Pos. through the relay coil 2SD through the contacts LSU6 and the limit switch contacts LS2 to the negative line Neg. In parallel with the contacts LSU6 and the contacts LS2 is a circuit including the contacts RSU6 (biased to open position) and the limit switch contacts RS2.

Circuit 18 extends from the positive line Pos. through the contacts IGF5 (biased to closed position) and the relay coil 2T to the negative line Neg.

Circuit 19 extends from the positive line Pos. through the contacts 2GF4 (biased to closed position) and the relay coil 3T to the negative line Neg.

Circuit 20 extends from the positive line Pos. through the contacts 3GF3 (biased to closed position) and the relay coil 4T to the negative line Neg.

Circuit 21 extends from the positive line Pos. through the contacts 4GF2 and the relay coil 5T to the negative line Neg.

Circuit 22 extends from the positive bus Pos. through the contacts ISD2 (biased to open position) and the relay coil 7T to the negative line Neg.

Circuit 23 extends from the positive line Pos. through the contacts IFW3 (biased to closed position) and the relay coil 8T to the negative line Neg. Shunting the normally closed contact IFW3 is the contact ISD3 (biased to open position).

Circuit 24 extends from the positive line Pos. through the contacts 8T2 (biased to open position) and the relay coil 9T to the negative line.

MODE OF OPERATION

Figure 3:
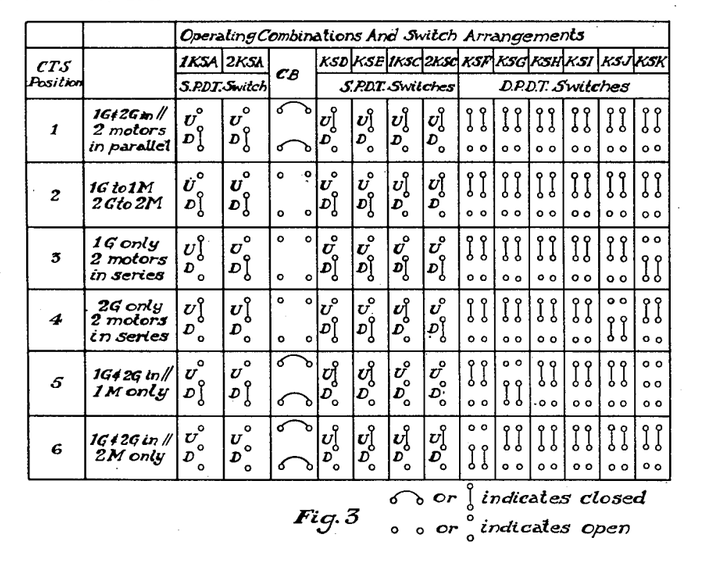
Figure 3 is a tabulation showing the positions of the several switches and circuit breakers when operating the skip hoist motor control in any of six possible combinations.
Figure 4:
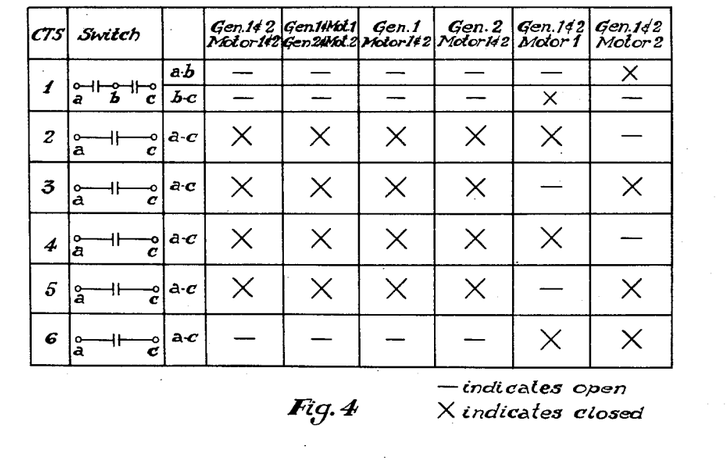
Figure 4 is a tabulation of the control transfer switch positions for setting up the various combinations referred to in connection with Figure 3.

By means of the switches IKSA, 2KSA, IKSC, 2KSC, KSE, KSD and the circuit breaker CB, the two motors having armatures MI and M2 and the two generators having the armatures GI and G2 may be connected in various combinations for various functions as scheduled on Figures 3 and 4. These several combinations will be explained individually as follows:

*Nos. 1 and 2 generators in parallel serving both motors in parallel*

To accomplish this combination, switches IKSC, 2KSC, KSD and KSE are closed in the up position. The circuit breaker CB is closed and switches IKSA and 2KSA are closed down. Under such conditions the motors and generators are in parallel and the generator series field windings are crossed to insure load equalization between the generators.

Overload relay protection is afforded by overload relay IOL in the No. 1 motor armature circuit and the overload relay 20L in the No. 2 motor armature circuit.

Series brake relays ISBR and 2SBR in the motor armature circuits control the release of the brakes under the influence of the motor series current.

Direction of the rotation of the motors is controlled by the directional contact or contacts IIL, IIR, I2L and I2R in the No. 1 motor circuit and 2IL, 2IR, 22L and 22R in the No. 2 motor circuit. These contacts are controlled by the respective directional relays heretofore shown, being controlled by the directional relays LSU and RSU, which, in turn, are controlled by the directional push buttons LSU—PB and RSU—PB according to the simplified diagram of Figure 2, but which might be controlled by any convenient combination of equipment.

Speed control is initially provided by the regulation of the generator voltage. This is accomplished by operating the relays 2GF, 3GF and 4GF. When successively closed, these relays build up the generator voltage in steps. It may be assumed that the exciter voltage has been regulated to a desired value (usually 230 volts D. C.) by means of the exciter field rheostat Ex. Sh. Fld. Rheo. Likewise control switch KSB must be closed providing energization (usually at 230 volts) of the generator shunt field winding, the motor shunt field windings, the brakes, and the control devices.

The generator shunt field windings are connected in series across the 230 volt circuit between the positive line Pos. and the negative line Neg., being in series with the contacts IGF1 and IGF2 and the voltage adjusting resistor having the taps R1, R2, R3 and R4, connections to which are controlled by the contacts 2GF, 3GF and 4GF. Control of this resistor affects the voltage applied to the motors M1, M2.

The series field windings of the No. 1 and 2 generators are controlled by means of the switches KSD and KSE. When the generators are operated in parallel the switches are both turned to the up positions connecting the series field winding of No. 1 generator in the No. 2 armature generator circuit and the series field winding of the No. 2 generator in the No. 1 generator armature circuit, thus accomplishing a balanced loading of the two generators.

The two-pole circuit breaker CB is provided to protect the generators from circulating current when they are operated in parallel. In practice suitable trip coils, not illustrated, are provided for operating the circuit breaker CB.

One generator serving both motors

Either generator may be cut out of circuit as desired by the proper manipulation of switches IKSA, 2KSA, KSD, KSE, IKSC and 2KSC in the armature circuit of the generators. When cutting out one generator it is desirable to cut out the shunt field winding of that generator. This is done by the selective manipulation of switches KSJ and KSK. When thrown up, switch KSJ connects the shunt field winding of generator No. 1 into circuit. When switch KSJ is thrown down, the resistor having the taps R12 and R13 is substituted for the field winding Gen. 1 Sh. Fld. Similarly when switch KSK is thrown up, the generator shunt field winding is connected in circuit and when said switch KSK is thrown down, the resistor having the taps R12, R13 is substituted for said winding. When the generators are operated individually, the generator series field windings are connected directly in their respective armature circuits by throwing switches KSD and KSE to their down positions.

Various combinations of motors and generators

According to the present invention, motor No. 1 and motor No. 2 may be operated separately or in parallel or in series as conditions dictate, the choice of operation being controlled by the choice of switch positions as indicated in Figures 3 and 4. Position No. 1 indicates conditions under which motors No. 1 and No. 2 are operated in parallel, being fed by No. 1 and No. 2 generators in parallel. Position No. 2 indicates conditions under which motor No. 1 is fed from generator No. 1 and motor No. 2 is fed from generator No. 2. Position 3 indicates conditions under which No. 1 generator feeds both No. 1 and No. 2 motors connected in series. Position No. 4 indicates conditions under which No. 2 generator feeds motor No. 1 and motor No. 2 in series. Position No. 5 indicates conditions under which No. 1 generator and No. 2 generator are connected in parallel, feeding No. 1 motor only. Position No. 6 indicates conditions under which No. 1 and No. 2 generators in parallel feed No. 2 motor.

Single motor operation

During periods of single motor operation it is desirable to cut out the shunt field winding of the motor not in use. This is accomplished by means of the motor field switches KSF and KSG (Figure 2, part B). When thrown into the up position, switch KSF will connect No. 1 motor shunt field winding in circuit. When said switch KSF is thrown down a replacement resistor having the taps R14, R15 will be connected in place of No. 1 motor shunt field winding, 1 Sh. Fld. When switch KSG is thrown to the up position, No. 2 motor shunt field winding is connected in circuit. When said switch KSG is thrown down, a replacement resistor having the taps R16, R17 is connected in the circuit.

In the shunt field circuit of the motors is a resistor having the taps R5, R6, R7, R8 and R9, having one of its terminals connected to the positive line Pos. and the other of its terminals connected to switch KSF, the other side of switch KSF being connected to one side of the switch KSG, the other side of said switch KSG being connected to the negative line Neg. This multitap resistor having the taps R5, R6, R7, R8 and R9, being in series with the shunt field windings 1 Sh. Fld. and 2 Sh. Fld., is a motor speed adjusting resistor. The speed variation may be accomplished by operation of the contacts 1FW1 and 2FW1. These contacts are adapted to shunt out portions of said resistor. In addition to the contacts 1FW1 and 2FW1 are two speed adjusting switches SAS1 and SAS2 which may be opened or closed to adjust the portion of the resistor affected by operation of the contact 2FW1, thus predetermining the top speed at which the motor or motors will operate.

The operating coils for the two brakes are shown diagrammatically in Figure 2, part B, said coils being connected in series across the circuit from the positive line Pos. to the negative line Neg. in series with the contacts 1BR1 and the contacts 2BR1 and a resistor having the taps R10, R11.

The brake operating the coils 1BRK and 2BRK are connected to or disconnected from the circuit by means of the knife switches KSH and KSI. When switch KSH is thrown up, it connects the operating coil 1BRK in circuit and when thrown down will connect in circuit a replacement resistor having the terminals R18, R19.

Knife switch KSI when thrown up will connect the operating coil of No. 2 brake and when thrown down will substitute the replacement resistor having the terminals R18, R19. The resistor having the terminals R10, R11 serves to limit the current in the brake coils to a safe value.

Continuing with Figure 2, part B, the plurality of circuits comprising the control of the generators, motors and the brakes and the other elements of the hoist control will now be discussed.

Referring to circuit 1 the stop reset push button is a two-element push button having top contacts a—a and bottom contacts b—b. One of the contacts a—a is connected to the positive line Pos. on one side of the contacts UV1 and one of the contacts b—b is connected to the positive line Pos. on the other side of said contacts UV1. The other contacts a and b are connected together and to the UV relay coil. From the other side of the UV relay coil the circuit continues through the normally closed contacts 10L1, 20L1, FL1 and SC1 to the negative line Neg. The contacts UV1 are actuated by the coil UV just referred to.

Should the continuity of the UV coil circuit be interrupted by the opening of one of the sets of contacts in series with the coil UV, it will become de-energized and remain so until the contacts are again closed.

To reclose the contacts UV1 following the opening of any of the contacts referred to, it is necessary to push the stop reset button to open the contacts b—b and close the contacts a—a. This re-establishes UV coil circuit resulting in the closure of contacts UV1. The push stop reset button may then be released. Contacts b—b are designed to close before contacts a—a open, and therefore the UV coil will remain energized.

Referring now to circuit 2, one side of the push button LSUPB is connected to the positive line Pos. and the other side is connected to the operating coil LSU, the other side of said operating coil being connected through the limit switch contacts LS1 to the negative line Neg. The push button coils LSUPB may be a standard push button element or it may be a master switch or it may be some actuating element of an allied control. The limit switch contacts LS1 are part of a limit switch mechanism driven in synchronization with the shaft of the winding drum 12.

Circuit 3 is analogous to circuit 2, the limit switch contacts RS1 being another part of the limit switch mechanism driven in synchronization with the drum 12.

Referring to circuits 4 and 5 (Figure 2, part B) the contacts LSU1 are responsive to energization of the coil LSU and the contacts RSU1 are responsive to energization of the coil RSU in circuit 3. Therefore the closure of either of the contacts LSU1 or RSU1 will result in the actuation of the brake relay coils 1BR and 2BR provided the remainder of the elements of the circuit are properly set up to function. The closure of the normally open contacts LSU1 or RSU1 is a function of the operation of the relay coils LSU or RSU which, in turn, are responsive to the push buttons LSU—PB or RSU—PB, respectively.

The normally open contacts 1SBR1 and 2SBR1 are responsive to their respective relay coils 1SBR and 2SBR, the former being in the armature circuit of motor No. 1 and the latter being in the armature circuit of motor No. 2 (Figure 2, part A).

Thus, when the motors are energized, the series brake relay contacts will close when sufficient current is built up in the armature circuits to cause them to function. This insures a current of proper magnitude to provide torque enough for the motors to handle the load before release of the brakes, for as soon as like contacts 1SBR and 2SBR close, the normally opened contacts 1SBR1 and 2SBR1 in the 1BR and 2BR circuits close. When either contacts LSU1 or contacts RSU1 are closed, circuit will be completed through the coils 1BR and 2BR, causing them to close contacts 1BR2 in the brake relay circuit (circuit 5), shunting the contacts 1SBR1 and 2SBR1. Normally closed contacts 1BR3 are in the 1T timer relay circuit (circuit 6), and when that circuit is open, the 1T timer starts its timing operation.

Simultaneously with the closing of contacts LSU1 or RSU1, as the case may be, several contacts associated with the coils LSU or RSU close. Therefore contacts LSU2, LSU3, LSU4, LSU5 and LSU6 or contacts RSU2, RSU3, RSU4, RSU5 and RSU6 are also closed.

Referring to circuit 8, circuit is completed from the positive line Pos. through contacts LSU2. In case of LSU operation, circuit would continue through the contacts LSU2 to points of the control transfer switch CTS2 and CTS3. During two-motor operation, both CTS2 and CTS3 will be closed. For No. 1 motor operation only CTS2 will be closed and for No. 2 motor operation only CTS3 will be closed.

Assuming two-motor operation with the LSU relay operated, contacts LSU2 will complete a circuit from the positive line Pos. through contacts CTS2 through the directional contactor coils 11L and 12L to the negative line Neg., closing the directional contactors 11L and 12L.

In like manner, the directional contactor coils 21L and 22L will be operative through contacts CTS3 for controlling No. 2 motor.

Referring to circuit 9, in case the switch RSUPB (instead of the switch LSUPB) be closed by the operator, circuit would be established through RSU2, CTS4, 11R and 12R to the negative line and through CTS5, 21R and 22R to the negative line.

Referring now to circuit 10, the contacts 1FW2 are closed in response to the energization of either of the directional relays LSU or RSU at the start of operation of the skip hoist. Likewise the normally closed contacts 1T2 are closed when the relay coil 1BR (circuit 4) is energized to open its normally closed contacts 1BR3 in the 1T relay circuit, thereby allowing contacts 1T2 to close, completing circuit through the coil 1GF and causing that relay to close its contacts 1GF1, 1GF2, 1GF3 and 1GF4 and causing the normally closed contacts 1GF5 to open.

Contacts 1GF1 and 1GF2 close the generator field circuit from the positive line Pos. through the adjusting resistor (having the taps R1, R2, R3 and R4) and through the generator shunt fields Gen. 1 Sh. Fld. and Gen. 2 Sh. Fld. to the negative line Neg. (Figure 2, part A.)

Contacts 1GF3 form a holding circuit in the 1GF relay circuit, shunting contacts 1FW2 (Figure 2, part B) which will open prior to the time required for 1GF relay to be deenergized.

Referring to circuits 11, 12 and 13, contacts 1GF4 form part of an interlock in the 2GF relay coil circuit to prevent it from closing before the 1GF relay is energized.

The normally closed contacts 1GF5 form part of the 2T timer relay coil circuit. The opening of contacts 1GF5 starts the 2T relay to time, the completion of which results in the de-energization of the operating coil 2T, causing contacts 2T1 to close after contacts 2SD1 and 1GF4 had closed.

In like manner the contacts responsive to the generator voltage control relay coils 3GF (circuit 12) and 4GF (circuit 13) are closed in sequence, resulting from the closure of contacts 2GF3, followed by the opening of contacts 2GF4 in the circuit of timer coil 3T, causing the delayed closing of contacts 3T1 in the 3GF coil circuit.

Relay coil 4GF is energized following the closure of contacts 4T1, timer coil 4T having been de-energized by reason of the opening of contacts 3GF4. Contacts 8T1 had previously been closed by reason of the energization of the relay coil 8T.

The procedure up to this point has completed the generator voltage build-up to its maximum and the next step is motor field weakening.

Proceeding now to a discussion of circuit 14, motor field weakening is accomplished in two steps, through the operation of the motor field weakening relays 1FW and 2FW. Operation of the relays 1FW and 2FW is initiated by closure of the contacts LSU4 or RSU4 which act initially on relay 1FW, the functioning of relay 1FW causing the actuation of the relay 2FW as follows:

When relay 4GF has operated, the 4GF2 normally closed contacts in the 5T timer circuit open, causing the contacts 5T1 of relay timer 5T to open after a time interval. In parallel with the relay coil 1FW circuit is a circuit including the timer relay coil 6T which is also de-energized when contacts 5T1 open. In parallel with contacts 5T1 are contacts 7T1 which respond to the time delay relay 7T, the energization of which is responsive to contacts 1SD2 which, in turn, are responsive to the relay 1SD which closes when the contacts UV1 are closed.

The relay coil 2FW is de-energized upon the opening of contacts 6T1 which opening occurs when the time delay contacts 5T1 open. Thus the contacts 1FW1 across the taps R5 and R6 and the contacts 2FW1 across the taps R6 to R9 of the speed adjusting resistor in series with the motor shunt field windings are opened in sequence, accelerating the motors to maximum speed after the generator voltage had previously been built up to a maximum.

With the hoist running at maximum speed it continues to operate in that manner until the mechanically operated limit switch LS or RS, driven from the hoist drum, has moved sufficiently far to cause the opening of switches LS1 or RS1 (depending respectively upon whether the left skip or the right ship is ascending) at which point the circuit of the relay coil 1SD is broken which circuit had been held closed while the contacts LSU5 or RSU5 were closed (circuit 16).

When the relay coil 1SD is de-energized, its contacts 1SD1 close and its contacts 1SD2, 1SD3 and 1SD4 all open. Closing of the contacts 1SD1 in circuit with the relay coil 2FW causes the energization of that relay coil closing the contacts 2FW1 across the motor shunt field adjusting resistor having the taps R6 to R9, causing the motors to slow down. When the contacts 1SD2 open, it causes the de-energization of the timer coil 7T, causing its contacts 7T1 to close after a predetermined time interval. This results in the energization of the coil 1FW, causing the contacts 1FW1 to close, shunting out the remainder of the motor shunt field resistor between taps R5 and R6, further slowing the motors. Contacts 1SD3 having opened and contacts 1FW3 being already opened, the time relay coil 8T is de-energized and accordingly after the lapse of a predetermined time interval, the contacts 8T1 and 8T2 open. The opening of contacts 8T1 breaks the circuit of the relay coil 4GF allowing the contacts 4GF1 to open, inserting into circuit that part of the generator shunt field resistor between contacts R3 and R4, lowering the generator voltage, thus further reducing the motor speed.

The opening of contacts 8T2 results in the de-energization of the time delay relay coil 9T whereby, after the lapse of a predetermined time interval, the timer relay contacts 9T1 will open (circuit 12).

Provided the first slow down relay 1SD has functioned as intended, the relay 3GF will be de-energized whereby its contacts 3GF1 will open, inserting additional resistance (between taps R2 and R3) into the generator field circuit, reducing the generator voltage still further. At this step the motors continue to operate until the limit switch has mechanically operated the switches LS2 or RS2 (depending upon whether the left skip or the right skip is ascending) causing the contacts LS2 or RS2 to open, thereby breaking circuit of the relay coil 2SD (circuit 17).

When the relay coil 2SD is de-energized, its contacts 2SD1 (circuit 11) open, thereby de-energizing the relay coil 2GF. Contact 2GF1, in the generator field circuit, opens, inserting into that circuit, that part of the resistor between taps R1 and R2, lowering the generator voltage to its lowest value.

The hoist continues to operate at reduced speed until the mechanical limit switch has traveled to a point where the switches LS3 or RS3 are open, thereby open circuiting the relay coil LSU or RSU, depending upon whether the left skip or the right skip is ascending.

When the coil LSU or the coil RSU is open circuited, all the contacts controlled by these coils are open. The opening of the contacts LSU3 or RSU3 (depending upon the direction of operation) results in the de-energization of the relay coil 1GF, allowing its corresponding contacts to open, completely de-energizing the generators, setting the brakes and stopping the hoist.

The foregoing discussion has referred to functions as they occur during operation as governed by position CTS No. 1 (Figures 3 and 4). For CTS position No. 2 operation of the hoist is in many respects the same as for CTS position No. 1, but the circuit breaker CB under conditions of position No. 2 is open; the generator series field windings are connected in their respective armature circuits instead of being cross-connected; and for CTS position No. 2 switches KSD and KSE are closed down. Otherwise all devices function as for position No. 1.

CTS position No. 3 refers to a circuit which permits No. 1 and No. 2 motors to be used in series. Under these conditions with only generator No. 1 in service, the motors will receive equal torque as the current from the generator passes through both motors. This insures equal gear loading and equal motor loading.

For CTS position No. 4 operation the connections established are similar to those for position No. 3 operation except that the No. 2 generator is used instead of No. 1, the motors being in series.

Conditions under CTS positions No. 5 and 6 are similar in that in each instance the generators are in parallel. Under position No. 5 only No. 1 motor is used and under position No. 6 only No. 2 motor is used. Under these operating conditions it is possible to take advantage of the marginal capacity of the mill type motors being used. This permits enhanced single motor operation without a corresponding increase in generator size.

Though a preferred embodiment of the present invention has been described in detail, many modifications will occur to those skilled in the art. It is intended to cover all such modifications that fall within the scope of the appended claims.

It is claimed:

1. In combination, a member to be driven, a first motor and a second motor mechanically connected to said member, said motors being of approximately the same capacity, a first generator having a capacity suitable for full powering one of said motors, a second generator of a capacity suitable for full powering the other of said motors, switch means for alternatively connecting each of said generators in separate power supplying relationship with its respective motor or for connecting either of said generators in power supplying relationship with said motors in series and control means responsive to movement of said member to be driven for modifying the circuits of said motors and generators to cause a prescribed cycle of movement of said member.

2. In combination, a member to be driven, a first motor, a first generator suitable for supplying said motor, a second motor, a second generator suitable for supplying said second motor, said motors being mechanically connected to said member, switch means for alternatively connecting said generators in parallel to supply said two motors in parallel or for connecting either of said generators to said two motors connected in series and control means responsive to movement of said member to be driven for modifying the circuits of said motors and generators to cause a prescribed cycle of movement of said member.

3. In combination, a member to be driven, a first motor, a first generator suitable for supplying said motor, a second motor, a second generator suitable for supplying said second motor, said motors being of approximately the same capacity, said motors being mechanically connected to said member, switch means for connecting said two motors independently to their respective generators or for connecting one of said generators with the two motors connected in series and control means responsive to movement of said member to be driven for modifying the circuits of said motors and generators to cause a prescribed cycle of movement of said member.

4. In combination, a member to be driven, a first motor, a first generator suitable for supplying said motor, a second motor, a second generator suitable for supplying said second motor, said motors being mechanically connected to said member, switch means for connecting said two motors independently to their respective generators or for connecting one of said generators with the two motors connected in series and control means responsive to movement of said member to be driven for modifying the circuits of said motors and generators to cause a prescribed cycle of movement of said member.

5. In combination, a member to be driven, a first motor, a first generator suitable for supplying said motor, a second motor, a second generator suitable for supplying said second motor, said motors being mechanically connected to said member, switch means for connecting said two motors and said two generators in parallel relationship or alternatively connecting one of said generators with the two motors connected in series and control means responsive to movement of said member to be driven for modifying the circuits of said motors and generators to cause a prescribed cycle of movement of said member.

6. In combination, a member to be driven, a first motor, a first generator suitable for supplying said motor, a second motor, a second generator suitable for supplying said second motor, said motors being mechanically connected to said member, switch means for connecting said two motors separately to their respective generators or for connecting said two motors to said generators connected in parallel or for connecting one of said generators with the two motors connected in series and control means responsive to movement of said member to be driven for modifying the circuits of said motors and generators to cause a prescribed cycle of movement of said member.

7. In combination, a member to be driven, a first motor, a first generator suitable for supplying said motor, a second motor, a second generator suitable for supplying said second motor, said motors being mechanically connected to said member, switch means for connecting one of said motors to said generators connected in parallel or for connecting one of said generators to said two motors connected in series and control means responsive to movement of said member to be driven for modifying the circuits of said motors and generators to cause a prescribed cycle of movement of said member.

8. In combination, a member to be driven, a first motor, a first generator suitable for supplying said motor, a second motor, a second generator suitable for supplying said second motor, said motors being mechanically connected to said member and switch means for alternatively connecting said generators to said motors individually or for connecting said generators in parallel to either one of said motors, or for connecting one of said generators to said motors in series, and control means responsive to movement of said member to be driven for modifying the circuits of said motors and generators to cause a prescribed cycle of movement of said member.

9. In combination, a member to be driven, a first motor, a first generator suitable for supplying said motor, a second motor, a second generator suitable for supplying said second motor, said motors being mechanically connected to said member, switch means for alternatively connecting each of said generators separately in power supplying relationship with its respective motor, or for connecting one of said generators to said two motors operating in series, and control means responsive to movement of said member to be driven for modifying the circuits of said motors and generators to cause a prescribed cycle of movement of said member.

10. In combination, a member to be driven, a first motor, a first generator suitable for supplying said motor, a second motor, a second generator suitable for supplying said second motor, said motors being mechanically connected to said member, switch means for connecting said two motors to said generators connected in parallel or for connecting one of said motors to said generators connected in parallel or for connecting one of said generators to said two motors connected in series, and control means responsive to movement of said member to be driven for modifying the circuits of said motors and generators to cause a prescribed cycle of movement of said member.

11. In combination, a member to be driven, a first motor, a first generator suitable for supplying said motor, a second motor, a second generator suitable for supplying said second motor, said motors being mechanically connected to said member, said generators having armatures and series field windings, switch means for connecting said two motors to said generator armatures connected in parallel and for cross-connecting said generator series field windings, or for connecting said two motors separately to their respective generators and for connecting the series field windings of said generators each in series with its respective armature, and control means responsive to movement of said member to be driven for modifying the circuits of said motors and generators to cause a prescribed cycle of movement of said member.

12. In a skip hoist assembly having at least one skip, a skip hoist drive assembly comprising in combination, a member to be driven which member in turn operates said skip, a first motor, a first generator suitable for supplying said motor, a second motor, each of said motors having a shunt field winding, a second generator suitable for supplying said second motor, said motors being mechanically connected to said member for driving said member, said generators having armatures, series field windings and shunt field windings, exciting means for exciting the shunt field windings of said motors and generators, switch means for connecting said two motors in parallel to said generator armatures connected in parallel wherein the series field windings of each generator is connected in series with the armature of the other generator, or for connecting said two motors separately to their respective generators wherein the series field windings of each of said generators is connected in series with its respective armature or for connecting one of said motors to said generator armatures connected in parallel wherein the series field winding of each of said generators is connected in series with its respective armature, or for connecting one of said generator armatures to said motors connected in series wherein the series field winding of each of said generators is connected in series with its respective armature, and control means responsive to the operation of said skip for modifying the circuits between said exciting means and the shunt field windings of either or both of said motors and generators to cause a prescribed cycle of operation of said skip.

13. The skip hoist assembly of claim 12, said motor and generator shunt field windings and said exciting means having variable resistance means connected therebetween, and said control means comprising interlocking relays, timers, contactors, control transfer switch means set in predetermined positions according to the setting of said switch means, a manual control switch means and limit switch means responsive to the operation of said skip; said limit switch means cooperating with said interlocking relays, timers, contactors, control transfer switch means and said manual control switch means to cause completion or opening of circuits between said exciting means and said generator shunt field winding, and variation of the resistance of said variable resistance means connected between said exciting means and said motor and generator shunt field windings, to cause a prescribed cycle of operation of said skip upon the manual operation of said manual control switch.

GORDON FOX.

REFERENCES CITED

The following references are of record in the file of this patent:

UNITED STATES PATENTS

| Number | Name | Date |
|--------|------|------|
| 1,390,624 | Lamme | Sept. 13, 1921 |
| 1,781,792 | Rodman | Nov. 18, 1930 |
| 2,433,786 | Ridgway | Dec. 30, 1947 |